(12) United States Patent
Pan

(10) Patent No.: US 8,990,509 B2
(45) Date of Patent: Mar. 24, 2015

(54) ACCELERATED PATH SELECTION BASED ON NUMBER OF WRITE REQUESTS AND SEQUENTIAL TREND

(71) Applicant: Hewlett-Packard Development Company, Houston, TX (US)

(72) Inventor: Weimin Pan, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 242 days.

(21) Appl. No.: 13/625,624

(22) Filed: Sep. 24, 2012

(65) Prior Publication Data

US 2014/0089584 A1   Mar. 27, 2014

(51) Int. Cl.
*G06F 12/08* (2006.01)

(52) U.S. Cl.
CPC ........................ *G06F 12/08* (2013.01)
USPC ........................................................ 711/138

(58) Field of Classification Search
None
See application file for complete search history.

(56) References Cited

U.S. PATENT DOCUMENTS

| | | | | |
|---|---|---|---|---|
| 5,261,066 A * | 11/1993 | Jouppi et al. | | 711/122 |
| 5,761,706 A * | 6/1998 | Kessler et al. | | 711/118 |
| 6,557,075 B1 * | 4/2003 | Maher | | 711/113 |
| 7,219,203 B2 * | 5/2007 | Zohar et al. | | 711/162 |
| 7,603,530 B1 * | 10/2009 | Liikanen et al. | | 711/162 |
| 7,707,367 B1 * | 4/2010 | Tran et al. | | 711/154 |
| 8,065,481 B1 * | 11/2011 | Hiller et al. | | 711/114 |
| 2010/0138672 A1 * | 6/2010 | Horie et al. | | 713/193 |
| 2011/0213924 A1 * | 9/2011 | Ledford | | 711/113 |
| 2012/0072661 A1 * | 3/2012 | Cho | | 711/114 |
| 2012/0117330 A1 * | 5/2012 | Donley et al. | | 711/138 |

OTHER PUBLICATIONS

Bhatia, S.; Varki, E.; Merchant, A, "Sequential Prefetch Cache Sizing for Maximal Hit Rate," Modeling, Analysis & Simulation of Computer and Telecommunication Systems (MASCOTS), 2010 IEEE International Symposium on , vol., No., pp. 89,98, Aug. 17-19, 2010.*

Norton, A. et al., Maximize the Performance of Microsoft Vista and Intel Matrix Raid, (Web Page), Aug. 21, 2009.

* cited by examiner

*Primary Examiner* — Jared Rutz
*Assistant Examiner* — Alex Olson
(74) *Attorney, Agent, or Firm* — Hewlett-Packard Patent Department

(57) ABSTRACT

Embodiments herein relate to selecting an accelerated path based on a number of write requests and a sequential trend. One of an accelerated path and a cache path is selected between a host and a storage device based on at least one of a number of write requests and a sequential trend. The cache path connects the host to the storage device via a cache. The number of write requests is based on a total number of random and sequential write requests from a set of outstanding requests from the host to the storage device. The sequential trend is based on a percentage of sequential read and sequential write requests from the set of outstanding requests.

20 Claims, 3 Drawing Sheets

ACCELERATED PATH SELECTION BASED ON NUMBER OF WRITE REQUESTS AND SEQUENTIAL TREND

BACKGROUND

Storage device controllers, such as RAID controllers, may be associated with a cache. A host seeking to write data to or read data from a storage device, may access the cache instead of the storage device, in order to reduce latency and increase performance. Manufacturers and/or vendors are challenged to provide more effective methods for reducing latency and increasing performance.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A storage device controller, such as a hybrid mode RAID controller, may allow a host to access a volume via either a cache path or an accelerated path. The cache path may include a cache of the controller, such as a RAID stack firmware, while the accelerated path may bypass the cache (or RAID stack firmware) and allow direct access to an individual physical drive of a RAID volume. The Input/Output (I/O) rate and/or processing power of a CPU of the controller may be limited, compared to that of the host.

Thus, the accelerated path may reduce overall latency and increase Input/Output Operations Per Second (IOPS). However, in order to bypass the cache (or RAID stack) and allow direct access, the cache must be disabled. Yet, without the cache, performance for some types of workloads may worsen, compared to the cache path, which include an enabled cache. For example, workloads such as sequential reads, sequential writes and light random writes, may perform better using the cache path. On the other hand, the cache path may reduce performance, compared to the accelerated path, for random reads and heavy random write workloads.

Embodiments may determine more quickly and/or accurately when to select the cache path or the accelerated path. For example, in an embodiment, one of the accelerated path and the cache path is selected based on at least one of a number of write requests and a sequential trend. The number of write requests is based on a total number of random and sequential write requests from a set of outstanding requests from the host to the storage device. The sequential trend is based on a percentage of sequential read and sequential write requests from the set of outstanding requests. Thus, embodiments may dynamically change the I/O submission path between the host and the storage device, as well as enable/disable the cache based on a workload type to increase or maximize overall performance.

Figure 1:
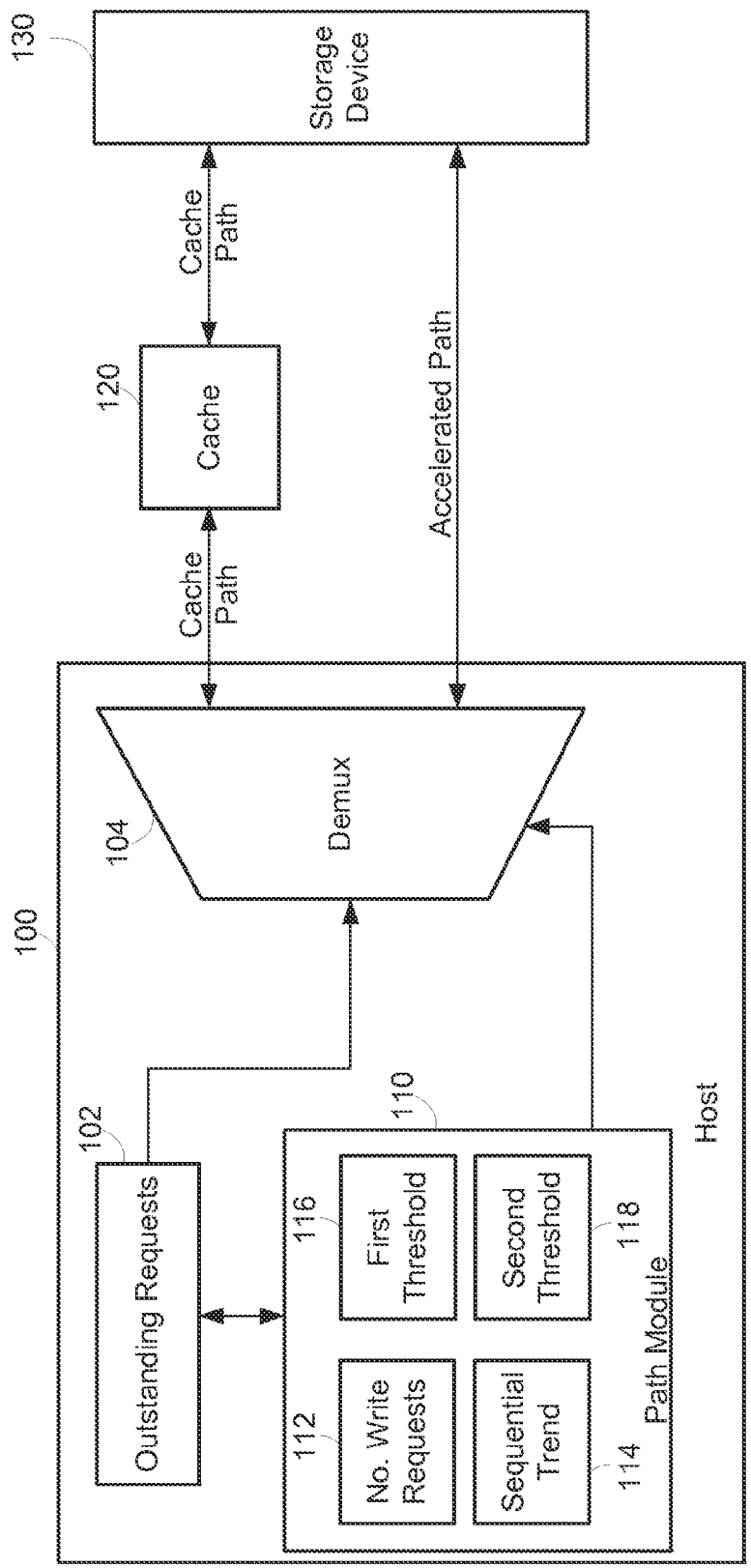
FIG. 1 is an example block diagram of a path module.

Referring now to the drawings, FIG. 1 is an example block diagram of a path module 110. While FIG. 1 shows the path module 110 to be included in a host 100, embodiments of the path module 110 may also be external to the host 100. For example, the path module 110 may also be included in a storage device controller (not shown) that interfaces with a storage device 130 and that is separate from the host 100.

In the embodiment of FIG. 1, the host 100 is further shown to include a demultiplexer (demux) 104 and a queue of outstanding requests 102. The host 100 also interfaces with the storage device 130 via two paths, an accelerated path and a cache path. The cache path includes a cache 120 between the host 100 and the storage device 130 while the accelerated path bypasses the cache 120 to directly connect the host 100 to the storage device 130.

The host 100 may refer to any type of device that seeks to access the storage device 130, such as a main processor of a computer or a computer connected to a computer network. The storage device 130 may be any electronic, magnetic, optical, or other physical storage device that contains or stores executable instructions, such as a hard disk drive (HDD), solid-state drive (SSD) and the like.

The cache 120 may be any type of device to store data to be written to and/or read from the storage device 130 so that requests from the host 100 to write and/or read data can be served faster. For example, data writes to and/or reads from the cache 120 may generally have a lower latency than that of the storage device 130. For instance, the cache 120 may include double data rate (DDR) RAM while the storage device 130 may include a HDD.

The path module 110 may include, for example, a hardware device including electronic circuitry for implementing the functionality described below, such as control logic and/or memory. In addition or as an alternative, the path module 110 may be implemented as a series of instructions encoded on a machine-readable storage medium and executable by a processor. For example, the path module 110 may independently run an application and/or operating system (OS) for interfacing with the cache 120, storage device 130 and/or host 100.

The path module 110 is to select one of the accelerated path and a cache path between the host 100 and the storage device 130 based on at least one of a number of write requests 112 and a sequential trend 114. The number of write requests 112 is based on a total number of random and sequential write requests from a set of outstanding requests 102 from the host 100 to the storage device 130. The sequential trend 114 is based on a percentage of sequential read and sequential write requests from the set of outstanding requests 102. The set of outstanding requests 102 includes one or more requests waiting to be sent from the host 100 to the storage device 130, due to the host submitting the requests faster than the cache 120 and/or storage device 130 can process the requests. Example types of requests may include a random write request, a random read request, a sequential read request, a sequential write request and the like.

The path module 110 is to select the cache path if the number of write requests 112 is less than a first threshold 116 or the sequential trend 114 is greater than or equal to a second threshold 118. The path module 110 is to select the accelerated path if there is a random read request or a heavy random write workload. The heavy random write workload includes the number of write requests 112 being greater than or equal to the first threshold 116 and the sequential trend 114 being less than the second threshold 118. An example value for the first threshold 116 may be four and an example value for the second threshold 118 may be fifty. Thus, in this case, the first threshold relates to there being at least 4 total write requests (random and/or sequential) while the second threshold relates to at least 50 percent of the outstanding requests being sequential requests (write and/or read).

As shown in FIG. 1 the demux 104 is to output to one of the cache path and the accelerated path. The demux 104 further receives a request from the set of outstanding requests 102 as an input and selects between the cache path and the accelerated path based on an output of the path module 110. For example, the path module 110 may assert a selection signal at a first logic level if the number of write requests 112 is less than the first threshold 116 or the sequential trend 114 is greater than or equal to the second threshold 118. The path module 110 may assert the selection signal at a second logic level if it detects the random read request or the heavy random write workload. The first logic level may be one of a high and low logic level and the second logic level may be an other (or remainder) of the high and low logic levels.

The demux 104 may select the cache path if the first logic level is asserted and select the accelerated path if the second logic level is asserted. Further, while FIG. 1 shows the demux 104, embodiments are not limited thereto and may include any type of component capable of selecting between two outputs, such as a switch.

Figure 2:
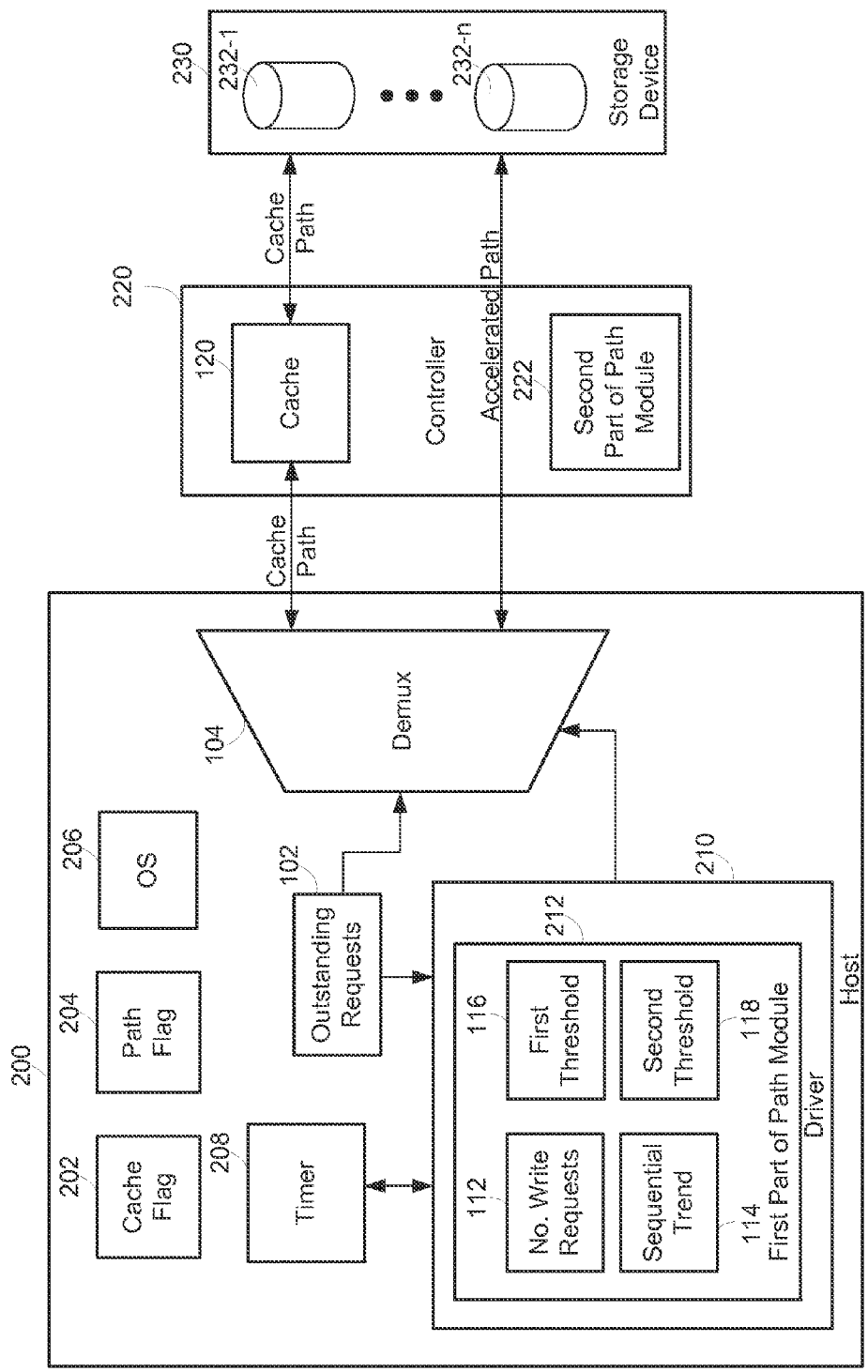
FIG. 2 is another example block diagram of a path module.

FIG. 2 is another example block diagram of a path module 212 and 222. In FIG. 2, a host 200 is to interface with a controller 220 and the controller 220 is to interface with a storage device 230. The controller is to include a cache 120. The cache and accelerated paths are to include the controller 220, with the cache path including the cache and the accelerated path bypassing the cache 120. The host 200 is to include a cache flag 202, a path flag 204, an operating system (OS) 206, a timer 208, the set of outstanding requests 102, the demux 104 and a driver 210. The driver 210 is to include a first part of a path module 212 and the controller 220 is to include a second part of the path module 222. While only the first part of the path module 212 is shown to include the number of write requests 112, the sequential trend 114, the first threshold 116 and the second threshold 118, the second part of the path module 222 may include similar elements and/or functionality to that of the first part of the path module 212.

The set of outstanding requests 102, the demux 104 and the cache 120 of FIG. 2 may be similar to the set of outstanding requests 102, the demux 104 and the cache 120 of FIG. 1. Further, the host 200 and the storage device 230 of FIG. 2 may include at least the functionality and/or hardware of the host 100 and the storage device 130 of FIG. 1. The cache flag 202, the path flag 204, the OS 206, the timer 208, the driver 210 and the controller 220 may include, for example, a hardware device including electronic circuitry for implementing the functionality described below, such as control logic and/or memory. In addition or as an alternative, the cache flag 202, the path flag 204, the OS 206, the timer 208, the driver 210 and the controller 220 may be implemented as a series of instructions encoded on a machine-readable storage medium and executable by a processor. The OS 206 may manage computer hardware resources and provides common services for computer programs of the host 200. The driver 200 may allow higher-level programs, such as the OS 206 to interact with a hardware device, such as the controller 220 or storage device 230.

The first and second parts of the path module 212 and 222 of FIG. 2 may include similar functionality and/or hardware to the path module 110 of FIG. 1. Moreover, the term path module may refer to the first and/or second parts of the path module 212 and 222. While FIG. 1 shows the first part of the path module 212 to be included in the host 200 and the second part of the path module 222 to be included in the controller 220, embodiments of the path module may be included in only one of the host 200 and the controller 220. Further, while the first part of the path module 212 is shown to be included in the driver 210, embodiments of the first part of the path module 212 may also be external to the driver 210.

For example, in one embodiment, the host 200 may not initially include any part of the path module while the controller 200 may include an entirety of the path module. However, before the host 200 is to switch from the cache path to the accelerated path, at least part of a functionality of the path module may be transferred to the host 200 so that the host 200 may continue to monitor the type of requests in the set of outstanding requests and calculate the number of write requests 112 and the sequential trend 114. Without continuously calculating the number of write requests 112 and the sequential trend 114, the host 200 would not know when to switch back to the cache path. In another embodiment, an entirety of the path module may reside in only the host 200. When the first part of the path module 212 is included in the host 200 and the second part of the path module 222 is included in the controller 220, the second part of the of the path module 212 may be disabled when the accelerated path is selected.

The controller 220 may couple to or be included in any type of computing device that interfaces with a storage device, such as a secure microprocessor, a notebook computer, a desktop computer, an all-in-one system, a server, a network device, a wireless device and the like. The storage device 230 is shown to further include a plurality of drives 232-1 to 232-$n$, where n is a natural number. The plurality of drives 232-1 to 232-$n$ may refer to storage mechanisms with fixed or removable media, such as separate HDDs, SSDs and the like.

For example, the plurality of drives 232-1 to 232-$n$ of the storage device 230 may define a structure referred to as a redundant array of independent disks (RAID). In this case, the cache 220 may include a Smart Array RAID firmware stack and the controller 220 may include a smart array controller. Moreover, the controller 220 may include RAID offload assist (ROA) firmware support that allows part of its RAID functionality to be offloaded to the driver 210 of the host 200, such as when the host 200 is to switch to the accelerated path. Thus, the driver 210 and/or first path of the path module 212 may be able to carry out functions such as converting a logical block address (LBA) to a physical address, disk striping, and parity.

The controller 220 is to clear and disable the cache 120 before the path module 212 and/or 222 switches from the cache path to the accelerated path. For example, the controller 220 may write any dirty data from the cache 120 to the storage device 230 before the accelerated path is selected. Moreover, in one embodiment, the path module 212 and/or 222 may set the cache flag 202 before the path module 212 and/or 222 switches from the cache path to the accelerated path. The set cache flag 202 is to indicate to the controller 220 to clear and disable the cache 120. The controller 220 may set the path flag 204 after the cache 120 is cleared and disabled. The first part of the path module 212 and/or host 200 may switch from the cache path to the accelerated path after the path flag 204 is set.

The first part of the path module 212 may reset the cache flag 202 before the first part of the path module 212 and/or host 200 switches from the accelerated path to the cache path. The reset cache flag 202 is to indicate to the controller 220 to enable the cache 120. The controller 220 is to reset the path flag 204 after the cache 120 is enabled. The path module 212 and/or 222 may switch from the accelerated path to the cache path after the path flag 204 is reset. Each of the volumes 232-1 to 232-n of the storage device 230 may be associated with a separate set of the cache and accelerated paths and a separate set of the cache and path flags 202 and 204.

While flags are described for notifying the host 200 and/or controller 220 about selection of the cache or accelerated path and enablement/disablement of the cache 120, embodiments are not limited thereto. For example, the controller 220 may instead signal a unit attention for the corresponding volume 232 of the storage drive 230. The host 200 and/or driver 2210 may then detect the unit attention and reads a specific vendor product description (VPD) page to determine if the accelerator path is enabled for the volume 232. If the accelerated path is enabled, the host 200 and/or driver 210 may switch to the accelerated path for that volume 232.

The path module 212 may switch from one of the accelerated and cache paths to an other of the accelerated cache paths after the timer 208 expires. The timer 208 may be set to a number based on a de-bouncing algorithm, such as 30 seconds or 1 minute. The debouncing algorithm may help to reduce or avoid switching between the accelerated path and the cache path too quickly or too often. The timer 208 may be reset after the path module 212 switches from one of the accelerated and cache paths to the other of the accelerated and cache paths.

Figure 3:
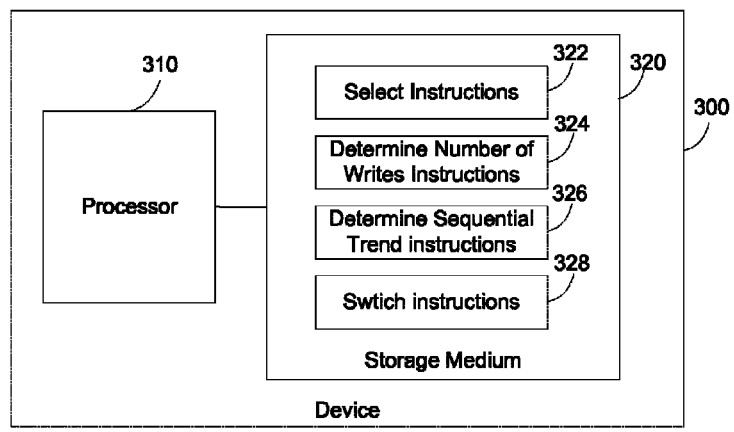
FIG. 3 is an example block diagram of a computing device including instructions for selecting an accelerated path based on a number of write requests and a sequential trend.

FIG. 3 is an example block diagram of a computing device 300 including instructions for selecting an accelerated path based on a number of write requests and a sequential trend. In the embodiment of FIG. 3, the computing device 300 includes a processor 310 and a machine-readable storage medium 320. The machine-readable storage medium 320 further includes instructions 322, 324, 326 and 328 for selecting the accelerated path based on the number of write requests and the sequential trend.

The computing device 300 may be, for example, a secure microprocessor, a notebook computer, a desktop computer, an all-in-one system, a server, a network device, a wireless device, or any other type of device capable of executing the instructions 322, 324, 326 and 328. In certain examples, the computing device 300 may include or be connected to additional components such as memories, sensors, displays, etc.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322, 324, 326 and 328 to implement selecting the accelerated path based on the number of write requests and the sequential trend. As an alternative or in addition to retrieving and executing instructions, the processor 310 may include at least one integrated circuit (IC), other control logic, other electronic circuits, or combinations thereof that include a number of electronic components for performing the functionality of instructions 322, 324, 326 and 328.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for selecting the accelerated path based on the number of write requests and the sequential trend.

Figure 4:
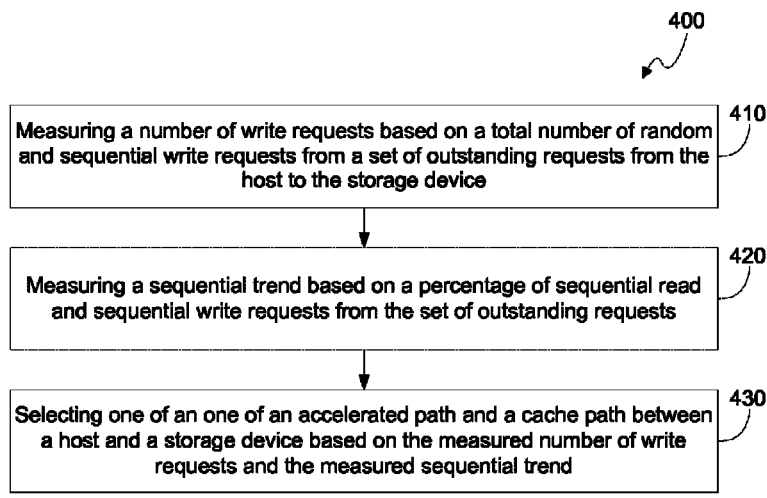
FIG. 4 is an example flowchart of a method for selecting an accelerated path based on a number of write requests and a sequential trend.

Moreover, the instructions 322, 324, 326 and 328 when executed by a processor (e.g., via one processing element or multiple processing elements of the processor) can cause the processor to perform processes, such as, the process of FIG. 4. For example, the select instructions 322 may be executed by the processor 310 to select a cache path to connect a host (not shown) to a storage device (not shown). The cache path may include a cache (not shown) between the host and the storage device.

The determine number of writes instructions 324 may be executed by the processor 310 to determine a number of write requests based on a total number of random and sequential write requests from a set of outstanding requests from the host to the storage device. The determine sequential trend instructions 326 may be executed by the processor 310 to determine a sequential trend based on a percentage of sequential read and sequential write requests from the set of outstanding requests. The switch instructions 328 may be executed by the processor 310 to switch to an accelerated path that bypasses the cache to connect the host and storage device, during at least one of a random read request and a heavy random write workload.

The heavy random write workload includes the determined number of write requests being greater than or equal to a first threshold and the determined sequential trend being less a second threshold. The first and second thresholds 116 and 118 are explained above with respect to FIG. 1. The machine-readable storage medium 320 may also include instructions (not shown) to disable the cache, if the switch instructions 328 are executed to switch from the cache path to the accelerated path, and to enable the cache, if the switch instructions 328 are executed to switch back from the accelerated path to the cache path.

FIG. 4 is an example flowchart of a method 400 for selecting an accelerated path based on a number of write requests and a sequential trend. Although execution of the method 400 is described below with reference to the path module 110, other suitable components for execution of the method 400 can be utilized, such as the path module 212 and/or 222. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the path module 110 measures a number of write requests 112. The total number of write requests 112 is based on a total number of random and sequential write requests from a set of outstanding requests 102 from a host 100 to a storage device 130. At block 420, the path module 110 measures a sequential trend 114 based on a percentage of sequential read and sequential write requests from the set of outstanding requests 102. The operations of block 410 and block 420 may be carried out interchangeably and/or simultaneously. Then, at block 430, the path module 110 selects one of an accelerated path and a cache path between the host 100 and the storage device 130 based on the measured number of write requests 112 and the measured sequential trend 114. The cache path includes a cache 120 between the host 100 and the storage device 130.

For example, at block 430, the path module 110 selects the cache path if the measured number of write requests 112 is less than a first threshold 116 or the measured sequential trend 114 is greater than or equal to a second threshold 118. The path module 110 selects the accelerated path if there is a random read request or a heavy random write workload. The heavy random write workload includes the measured number of write requests 112 being greater than or equal to the first threshold 116 and the measured sequential trend 114 being less than the second threshold 118. The first and second thresholds 116 and 118 are explained above with respect to FIG. 1.

According to the foregoing, embodiments provide a method and/or device for determining more quickly or accurately when to select the cache path or the accelerated path. By monitoring a number of write requests and a sequential trend from a set of outstanding requests, embodiments may dynamically change the I/O submission path between the host and the storage device, as well as enable/disable the cache, based on a workload type to increase or maximize overall performance.

We claim:

1. A device comprising:
   a path module to select one of an accelerated path and a cache path between a host and a storage device based on a measured number of write requests and a measured sequential trend, wherein
   the cache path connects the host to the storage device via a cache,
   the measured number of write requests is based on a total number of random and sequential write requests from a set of outstanding requests from the host to the storage device, and
   the measured sequential trend is based on a percentage of sequential read and sequential write requests from the set of outstanding requests.

2. The device of claim 1, wherein the path module is to select the cache path in response to at least one of:
   the measured number of write requests is less than a first threshold, and
   the measured sequential trend is greater than or equal to a second threshold.

3. The device of claim 2, wherein,
   the path module is to select the accelerated path in response to at least one of a random read request and a heavy random write workload, and
   the heavy random write workload includes:
      the measured number of write requests being greater than or equal to the first threshold, and
      the measured sequential trend being less than the second threshold.

4. The device claim 1, wherein,
   the path module is to switch from one of the accelerated and cache paths to an other of the accelerated cache paths after a timer expires, the timer to be set to a number based on a de-bouncing algorithm, and
   the timer is reset after the path module switches from one of the accelerated and cache paths to the other of the accelerated and cache paths.

5. The device of claim 1, wherein the accelerated path directly connects the host to the storage device.

6. The device of claim 5, wherein,
   the path module is included in at least one of the host and a controller, the controller to include the cache, and
   at least a first part of the path module is included in the host if a second part of the path module is included in the controller, the second part of the of the path module to be disabled when the accelerated path is selected.

7. The device of claim 6, wherein the cache path and the accelerated path interface with the controller and the controller interfaces with the storage device.

8. The device of claim 7, wherein the controller is to clear and disable the cache before the path module switches from the cache path to the accelerated path.

9. The device of claim 8, wherein,
   the path module is to set a cache flag before the path module switches from the cache path to the accelerated path, the set cache flag to indicate to the controller to clear and disable the cache, and
   the controller is to set a path flag after the cache is cleared and disabled, the path module to switch from the cache path to the accelerated path after the path flag is set.

10. The device of claim 9, wherein,
    the path module is to reset the cache flag before the path module switches from the accelerated path to the cache path, the reset cache flag to indicate to the controller to enable the cache, and
    the controller is to reset the path flag after the cache is enabled, the path module to switch from the accelerated path to the cache path after the path flag is reset.

11. The device of claim 10, wherein,
    the storage device includes a redundant array of independent disks (RAID) include a plurality of volumes,
    each of the volumes is associated with a separate set of the cache and accelerated paths and a separate set of the cache and path flags.

12. A method, comprising:
    measuring a number of write requests based on a total number of random and sequential write requests from a set of outstanding requests from a host to a storage device;
    measuring a sequential trend based on a percentage of sequential read and sequential write requests from the set of outstanding requests; and
    selecting one of an accelerated path and a cache path between the host and the storage device based on the measured number of write requests and the measured sequential trend, wherein
    the cache path includes a cache between the host and the storage device.

13. The method of claim 12, wherein the selecting further includes,
    selecting the cache path if at least one of the measured number of write requests is less than a first threshold and the measured sequential trend is greater than or equal to a second threshold, and
    selecting the accelerated path in response to at least one of a random read request and a heavy random write workload.

14. The method of claim 13, wherein the heavy random write workload comprises:
    the measured number of write requests being greater than or equal to the first threshold, and
    the measured sequential trend being less than the second threshold.

15. The method of claim 12, further comprising:
    prior to switching from the cache path to the accelerated path, clearing and disabling the cache.

16. The method of claim 12, wherein the accelerated path directly connects the host to the storage device.

17. A non-transitory computer-readable storage medium storing instructions that, if executed by a processor of a device, cause the processor to:
  select a cache path to connect a host to a storage device, the cache path to include a cache between the host and the storage device;
  determine a number of write requests based on a total number of random and sequential write requests from a set of outstanding requests from the host to the storage device;
  determine a sequential trend based on a percentage of sequential read and sequential write requests from the set of outstanding requests; and
  switch to an accelerated path that bypasses the cache to connect the host and storage device, during at least one of a random read request and a heavy random write workload, the heavy random write workload to include the determined number of write requests being greater than or equal to a first threshold and the determined sequential trend being less a second threshold.

18. The non-transitory computer-readable storage medium of claim 17, further comprising instructions that, if executed by the processor, cause the processor to:
  disable the cache, if the switching switches from the cache path to the accelerated path; and
  enable the cache, if the switching switches back from the accelerated path to the cache path.

19. The non-transitory computer-readable storage medium of claim 17, further comprising instructions that, if executed by the processor, cause the processor to:
  switch to the cache path in response to at least one of:
    the number of write requests is less than a first threshold, and
    the sequential trend is greater than or equal to a second threshold.

20. The non-transitory computer-readable storage medium of claim 17, wherein the accelerated path directly connects the host to the storage device.

\* \* \* \* \*

UNITED STATES PATENT AND TRADEMARK OFFICE
CERTIFICATE OF CORRECTION

| | | |
|---|---|---|
| PATENT NO. | : 8,990,509 B2 | Page 1 of 1 |
| APPLICATION NO. | : 13/625624 | |
| DATED | : March 24, 2015 | |
| INVENTOR(S) | : Weimin Pan et al. | |

It is certified that error appears in the above-identified patent and that said Letters Patent is hereby corrected as shown below:

In the Drawings

In sheet 3 of 3, reference numeral 328, line 1, delete "Swtich" and insert -- Switch --, therefor.

In the Claims

In column 7, line 55, in Claim 4, delete "device claim" and insert -- device of claim --, therefor.

Signed and Sealed this
Twenty-eighth Day of July, 2015

Michelle K. Lee
*Director of the United States Patent and Trademark Office*